(12) United States Patent
Kwang

(10) Patent No.: US 6,243,345 B1
(45) Date of Patent: Jun. 5, 2001

(54) CD CLEANING AND LABELING DEVICE

(76) Inventor: Yun-Ming Kwang, 4F, No.5, Aly.35, Ln.118, WuShin St., Taipei (TW)

( * ) Notice: Subject to any disclaimer, the term of this patent is extended or adjusted under 35 U.S.C. 154(b) by 0 days.

(21) Appl. No.: 09/328,381

(22) Filed: Jun. 9, 1999

(30) Foreign Application Priority Data

Apr. 16, 1999 (TW) .................................................. 88205870

(51) Int. Cl.[7] ...................................................... G11B 3/58
(52) U.S. Cl. ................................................. 369/72; 15/97.1
(58) Field of Search ............................ 369/72, 289, 291; 156/556; 15/97.1, 88.2, DIG. 14

(56) References Cited

U.S. PATENT DOCUMENTS

| | | | | |
|---|---|---|---|---|
| 4,520,470 | * | 5/1985 | d'Arc | 369/72 |
| 4,654,917 | * | 4/1987 | Yeung | 15/97.1 |
| 4,662,025 | * | 5/1987 | Fritsch | 15/246 |
| 4,709,437 | * | 12/1987 | Hehn et al. | 15/97.1 |
| 4,750,231 | * | 6/1988 | Kogashiwa | 15/97.1 |
| 4,825,497 | * | 5/1989 | Nagao et al. | 15/97.1 |
| 5,307,535 | * | 5/1994 | Reuter et al. | 15/97.1 |
| 5,584,089 | * | 12/1996 | Huang | 15/97.1 |
| 5,822,822 | * | 10/1998 | Weng | 15/97.1 |
| 5,912,875 | * | 6/1999 | Lowe et al. | 369/291 |
| 5,963,526 | * | 10/1999 | Lee | 369/72 |

* cited by examiner

Primary Examiner—David L. Ometz
Assistant Examiner—Angel Castro
(74) Attorney, Agent, or Firm—Dougherety & Troxell

(57) ABSTRACT

A CD cleaning and labeling device comprises an upper case engageable with a lower case to form a compartment therein. The upper case has an actuating means to drive a driving means and at least one cleaning means. The lower case has a base for carrying a CD or a CD label, a driven means engageable with the driving means and a movable sticking seat which may be lifted above the base at an extension position for receiving the CD or be pressed downward by means of the closed upper case for performing the CD cleaning or labeling operation.

17 Claims, 5 Drawing Sheets

CD CLEANING AND LABELING DEVICE

BACKGROUND OF THE INVENTION

1. Field of the Invention

This invention relates to a CD cleaning and labeling device, and more particularly to a CD-processing box with both cleaning and labeling functions.

2. Description of the Prior Art

Generally, after leaving a production line or after recorded, a CD should be labeled for indicating contents, records, advertisement or other purposes. Also, a CD-R or CD after being used for a period of time should be cleaned to wipe up any contamination on the recording surface so that high reading quality can be maintained. Conventional method of cleaning CD usually includes brushing or sweeping CD surface manually. There is also a CD cleaning kit in the market that includes a case for containing a CD and an actuating means to rotate a cleaning pad for brushing over the CD surface.

On the other hand, one label-applying device is developed uniquely for CD labeling. Usually, the label for a CD is an annular sticker to fit one side of the CD. The side of the CD for sticking the label is defined as a label-sticking surface, and the opposing side of the same CD is defined as a recording surface. While in CD labeling, the label-sticking surface is faced down for being pressed onto a lower label.

Conventionally, CD cleaning and CD labeling need different means to perform; i.e., using one device for cleaning the CD and another device for labeling the CD. Obviously, that a CD needs two devices for maintenance is costly and wastes service time.

SUMMARY OF THE INVENTION

In view of aforesaid disadvantages, it is therefore an object of this invention to provide a CD cleaning and labeling device that can perform CD cleaning and CD labeling in a unique apparatus for reducing cost and production time.

The CD cleaning and labeling device according to this invention includes an upper case pivotally engaged with a lower case for forming a closed container to house a CD therein. The upper case has a driving means engageable with a cleaning means, and both of which are manually driven by an actuating means located outside the upper case. The lower case has a base for holding the CD, a driven means engageable with the driving means and the base, and a sticking seat movable up or down in the center of the base for lifting or lowering the CD corresponding to an extension position or an retracting position.

When in use for cleaning, the upper case may engage with the lower case, the driving means may engage with the driven means, the sticking seat is in the retracting position, and the cleaning means presses a CD located upon the base with a face-up recording surface. Driven by the actuating means, the driven means rotates accordingly and co-rotates the base, and thereby the CD on the base can be brushed by the cleaning means.

When in use for labeling, the upper case is opened and the sticking seat is arranged at the extension state first, place a label on the base with a gluing surface facing up, and dispose a CD on the sticking seat with the label-sticking surface facing down. By closing the upper case to engage with the lower case, the sticking seat and the CD will be lowered by the upper case and move downward to make contact with the gluing surface of the label. Then, the label can be well adhered to the CD after the upper case and the lower case is closed completely. Further, by turning the driving means, the cleaning means can run over the whole CD surface to ensure the label firmly and smoothly adhered to the CD.

According to one aspect of this invention, the upper case is pivotally engaged with the lower case by means of a spindle or the like. At least one cleaning means are provided for giving substantial pressure upon the CD. The cleaning means may be driven by the driving means through a gear set located in between. The base may be supported by an elastic means to get sufficient spring force against the depression from the upper case, and thereby the tight contact between the CD and the cleaning means while closing the upper and the lower cases can be confirmed. The driven means and the sticking seat are located in a center recess of the base. Below the lower case, an auxiliary compartment may be provided for holding other auxiliary materials such as a cleaning CD for cleaning an optical pick-up.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
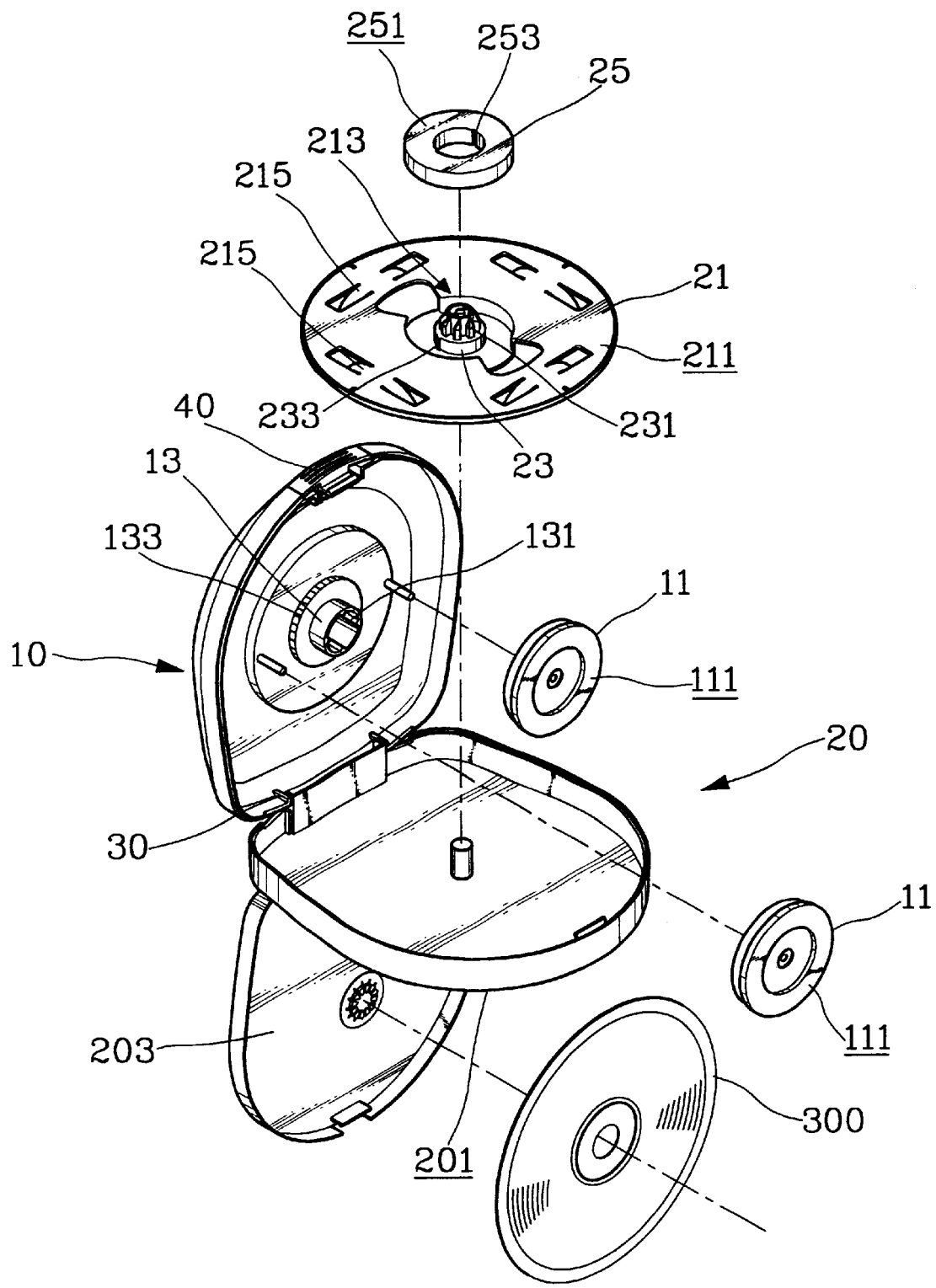
FIG. 1 is a perspective exploded view of this invention.
Figure 2:
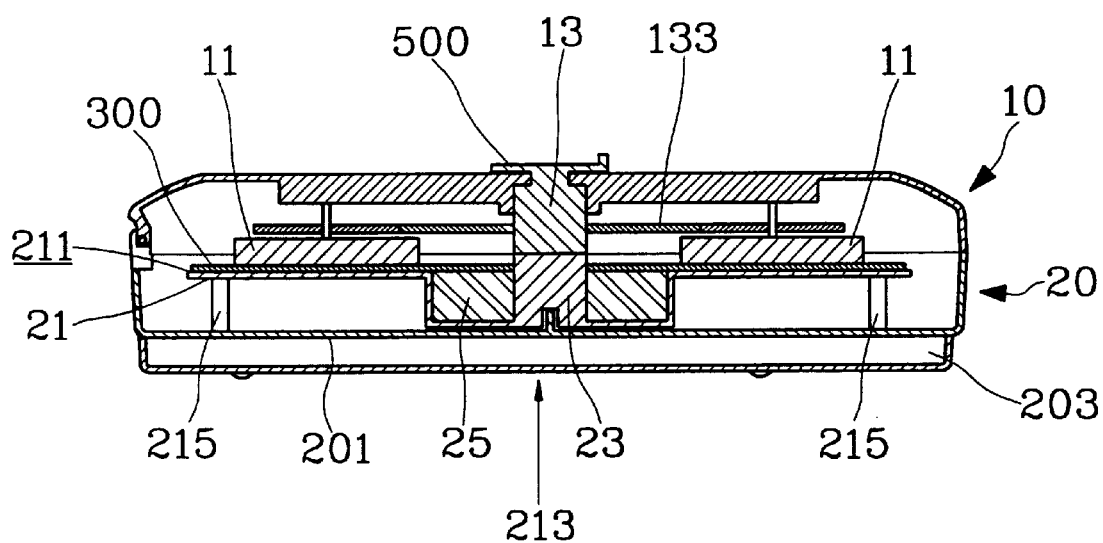
FIG. 2 is a sectional view of this invention in use for CD cleaning.

Referring now to FIGS. 1 and 2, the CD cleaning and labeling device according to this invention includes an upper case 10 pivotally engageable with a lower case 20 by means of a pivotal means 30 located at one side and may be latched at another side by means of a latching means 40 to form a closed compartment for housing a CD therein. The pivotal means 30 and the latching means 40 may be substituted by other similar means known in the art.

The upper case 10 is formed in a convex basin shape and has a center opening to engage with an actuating means 500 located outside the upper case 10. Within the upper case 10, there is a driving means 13 engageable with the actuating means 500 and at least one cleaning means 11. The driving means 13 includes a hollow tube 131 that has a inner gear-shaped interior and attaches a main gear 133 around the hollow tube. The gear-shaped interior may be substituted by other engaging means known in the art.

The cleaning means 11 is a disk-shaped wheel which has a flat surface 111 attached either fully or partly with a CD cleaning medium such as fluff, cloth, brush or the like. The cleaning means 11 may further be pivotally supported by a spindle and may attach a gear to engage with the main gear 133. FIG. 1 shows an embodiment that has two cleaning means 11 apart from each other at 180 degree to get even pressure on the CD surface during cleaning operation.

The actuating means 500 may be any manual rotating means known in the art, such as a crank shaft, a wheel, a counter sunk head screw or the like.

The lower case 20 is formed in a concave basin shape but with a flat bottom wall and a top opening to mate and engage with the upper case 10. In the lower case 20, there are a disk-shaped base 21 which has a supporting surface 211 for carrying a CD thereon, a base center 213 for aligning with the CD center, a plurality of elastic members 215 located thereunder; a driven means 23 located above the base center having an engaging shaft 231 for engaging with the hollow tube 131 and a plurality of bulges 233 formed on the outside circumference; and an annular sticking seat 25 located in the base center 213. The sticking seat 25 further has a plurality of keyways 253 in the inside circumference for engaging with the respective bulges 233. Thus, the sticking seat 25 may move up to the extension position or move down to the retracting position and engages with the driven means 23 at both positions. Under the sticking seat 25, there may be provided with elastic members (not shown in the figures) for lifting the sticking seat 25 upward at the extension position to make the top surface 25 of the sticking seat 25 above the supporting surface 211. However, when the sticking seat 25 is being pressed downward at the retracting position, its top surface 25 will be no higher than the supporting surface 211. The outer diameter of the sticking seat 25 is larger than the center opening of the CD but is smaller than the center opening of the CD label.

In the present invention, the keyways 253 and the engaged bulges 233 form a sliding means for allowing the sticking seat 25 to move along the driven means 23 within a predetermined stroke. The sliding means is well known in the art and can also be embodied as a bulge-and-keyway mechanism, a track-and-sliding block mechanism, or any like mechanism that permits the sliding between the sticking seat 25 and the driven means 23 within a predetermined stroke.

FIG. 2 shows this invention in use for CD cleaning. A CD 300 is placed on the base 21 firstly, with the sticking seat 25 posing the retracting position. The upper case 10 is then moved to engage with the lower case 20. After closing the upper case 10 onto the lower case 20, the cleaning means 11 will make forced contact with the CD recording surface. Turning the actuating means 500 to rotate the driving means 13 which in turn drives the cleaning means 11 to rotate, the CD cleaning surface 111 will sweep or brush the CD recording surface to remove dusts or dirties that might be harmful to CD reading quality.

Figure 3:
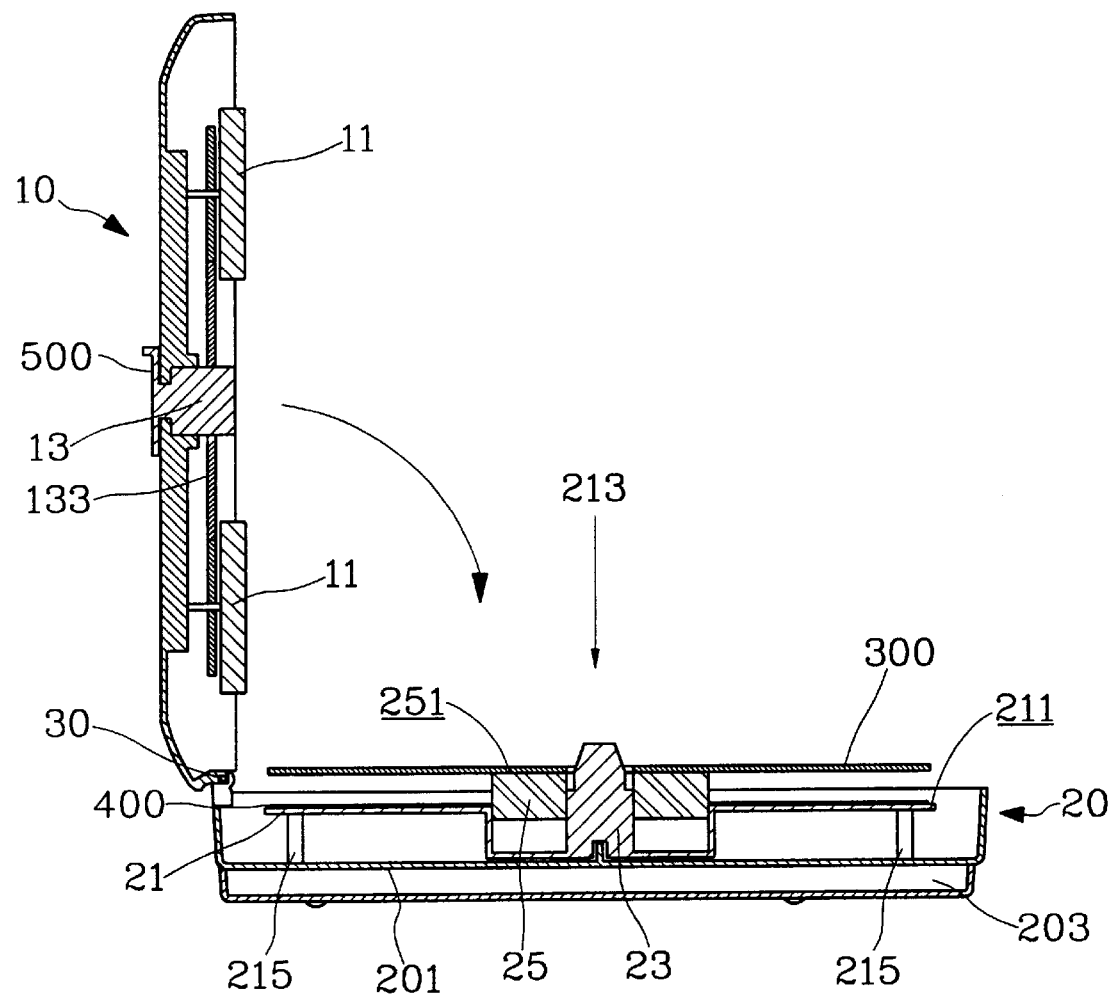
FIG. 3A is a sectional view of this invention with the upper case being opened.
FIG. 3B is a sectional view of this invention with the upper case being closed.
FIG. 3C is a sectional view of this invention in use for CD labeling.
Figure 3:
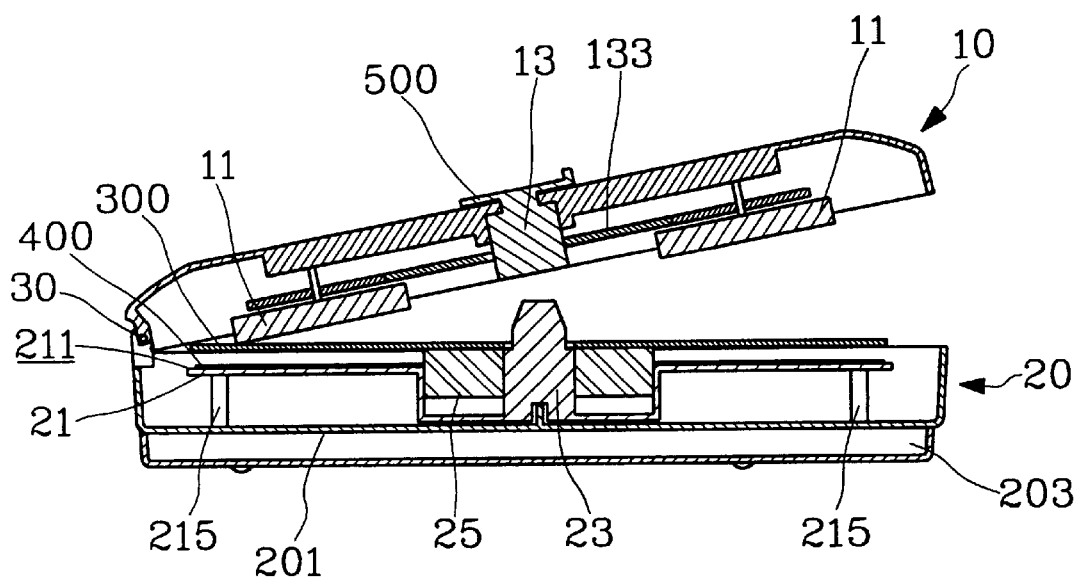
Figure 3:
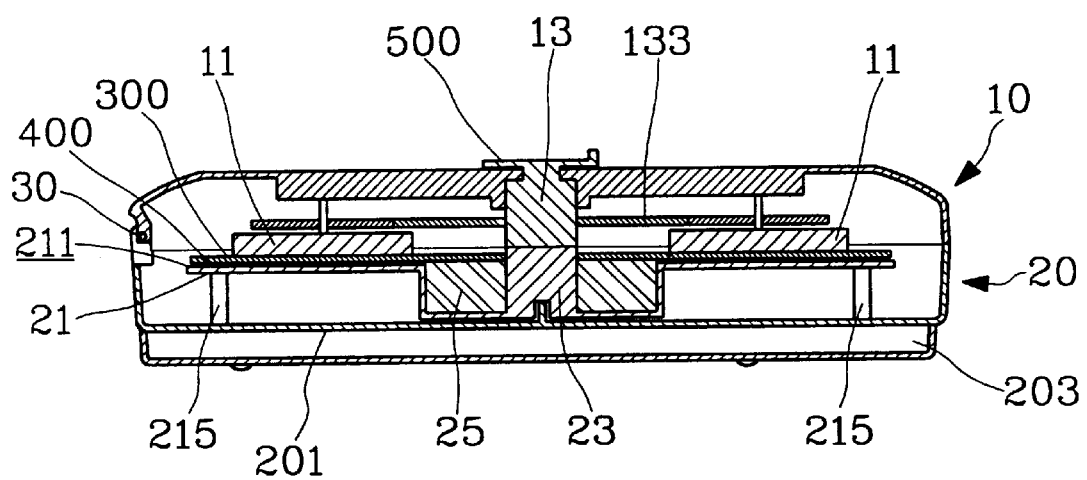

FIGS. 3A, 3B and 3C illustrate this invention in use for labeling operations. Before the labeling operation, the sticking seat 25 needs to be lifted upward at the extension position. The upper case 10 is open (FIG. 3A) for placing a CD label 400 on the supporting surface 211 with the gluing surface of the label 400 facing up. Then, placing the CD 300 on the top surface 251 of the sticking seat 25 with the label-sticking surface facing down. By closing the upper case 10, the cleaning means 11 and the front end of the hollow tube 131 of the driving means 13 will press the CD 300 and push the sticking seat 25 downward to the retracting position so that the CD label-sticking surface will make contact with the gluing surface of the label 400. Then, the label 400 can be firmly adhered to the CD 300. Rotating the driving means 13 which turns the supporting surface 211 and the CD 300 and the label 400, the label 400 will adhere to the CD 300 securely with the aid of the pressure from the cleaning means 11 and the elastic members 215.

Accordingly to another embodiment of this invention, an openable auxiliary compartment 203 may be provided below the bottom 201 of the lower case for storing CD cleaning material such as small brush, screw driver, cleaning agent, cleaning CD or the like (shown in FIG. 1). The auxiliary compartment 203 may engage with the lower case 20 by means of latching means known in the art such as snap lock, screw, latch, lever or the like.

Therefore, through this invention, a unique box-type device may serve two functions in CD cleaning and labeling.

It may thus be seen that the object of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed:

1. A CD cleaning and labeling device comprising;
   a basin-shaped upper case, having a recess which includes at least one cleaning means having a flat bottom cleaning surface for cleaning CDs and a driving means pivotally mounted on the upper case having an engaging lower end and being engaged at another end with an actuating means located outside the upper case;
   a lower case engageable with the upper case, having a base which has a supporting surface for holding a CD and a base center aligning with a CD center, a driven means connected with the base and having an engaging shaft engageable with the driving means; and
   a movable sticking seat located in the base center, having a smaller size than a center opening of a CD label, with an extension position to be higher than the supporting surface, and with a retracting position to be no higher than the supporting surface;
   while in CD cleaning operation, the CD being placed upon the supporting surface of the base with the sticking seat located at the retracting position, the upper case being engaged with the lower case for the cleaning means to press and brush the CD with the cleaning surface through rotating the actuating means, which in turn turns the driving means and the engaged driven means; and while in label-sticking operation, the CD being placed on the sticking seat at the extension position, the upper case being closed to engage with the lower case with the cleaning surface of the cleaning means and the driving means pressing the sticking seat to the retracting position for the CD to be glued to a label located upon the supporting surface.

2. The CD cleaning and labeling device of claim 1, wherein the cleaning means includes at least two units so as to press the CD evenly when the upper case engages with the lower case.

3. The CD cleaning and labeling device of claim 1, wherein the cleaning means is pivotally engaged with the upper case.

4. The CD cleaning and labeling device of claim 3, wherein the cleaning means has a gear engageable with the driving means for the driving means to drive the cleaning means.

5. The CD cleaning and labeling device of claim 1, wherein the base has an elastic means located thereunder for providing spring force against the depression from the cleaning means.

6. The CD cleaning and labeling device of claim 5, wherein the elastic means includes a plurality of spaced spring members.

7. The CD cleaning and labeling device of claim 5, wherein the elastic means includes a plurality of equally spaced compressing strip springs.

8. The CD cleaning and labeling device of claim 1, wherein the driven means is located at the base center and the sticking seat being annular-shaped and surrounding the driven means.

9. The CD cleaning and labeling device of claim 1 further having an openable auxiliary compartment below the lower case for storing cleaning materials.

10. The CD cleaning and labeling device of claim 1, wherein the sticking seat is an independent member removable from the lower case.

11. A CD cleaning kit, comprising;
a basin-shaped upper case, for accommodating thereinside:
at least a cleaning means which has a flat bottom cleaning surface for cleaning CDs; and
a driving means pivotally mounted on the upper case, having an engaging lower end and being engaged with an actuating means located outside the upper case;
a lower case engageable with the upper case, having:
a base, having a supporting surface to carry a CD and having a base center aligning with CD center, wherein the base has an elastic means located thereunder for providing cushion to absorb pressing force resulting from the cleaning means;
a driven means, connected with the base and having an engaging shaft engageable with the driving means; and
an openable auxiliary compartment, located below the lower case for storing cleaning materials.

12. The CD cleaning kit of claim 11, wherein the elastic means includes a plurality of spaced spring members.

13. The CD cleaning kit of claim 11, wherein the elastic means includes a plurality of equally spaced compressing strip springs.

14. The CD cleaning kit of claim 11 further having a movable sticking seat located in the base center and being smaller in size than a center opening of a CD label, the sticking seat having an upper surface above the supporting surface at an extension position and no higher than the supporting surface at a retracting position.

15. The CD cleaning kit of claim 14, wherein the driven means is located at the base center, and the sticking seat being annular-shaped and surrounding the driven means.

16. The CD cleaning kit of claim 11 further having an independent sticking seat, with an outer diameter no larger than an inner diameter of a CD label; while in label-sticking operation, placing the sticking seat to the base center, placing the label through the sticking seat and onto the supporting surface of the base, then removing the sticking seat, placing the CD onto the label, and closing the upper case and the lower case for firmly depressing the CD onto the label.

17. A CD cleaning kit, comprising;
a basin-shaped upper case, for accommodating thereinside:
at least a cleaning means which has a flat bottom cleaning surface for cleaning CDs; and
a driving means pivotally mounted on the upper case, having an engaging lower end and being engaged with an actuating means located outside the upper case;
a lower case engageable with the upper case, having:
a base, having a supporting surface to carry a CD and having a base center aligning with CD center;
a driven means, connected with the base and having an engaging shaft engageable with the driving means;
an openable auxiliary compartment, located below the lower case for storing cleaning materials; and
an independent sticking seat, with an outer diameter no larger than an inner diameter of a CD label; while in label-sticking operation, placing the sticking seat to the base center, placing the label through the sticking seat and onto the supporting surface of the base, then removing the sticking seat, placing the CD onto the label, and closing the upper case and the lower case for firmly depressing the CD onto the label.

* * * * *